(12) United States Patent
Heinfried et al.

(10) Patent No.: US 7,618,045 B2
(45) Date of Patent: Nov. 17, 2009

(54) SEALING ARRANGEMENT

(75) Inventors: Hoffmann Heinfried, Frankfurt am Main (DE); Eugen Nebel, Nidderau-Windecken (DE)

(73) Assignee: Samson AG, Frankfurt am Main (DE)

( * ) Notice: Subject to any disclaimer, the term of this patent is extended or adjusted under 35 U.S.C. 154(b) by 890 days.

(21) Appl. No.: 10/939,164

(22) Filed: Sep. 10, 2004

(65) Prior Publication Data
US 2005/0098960 A1    May 12, 2005

(30) Foreign Application Priority Data
Sep. 16, 2003   (DE) ................ 103 42 751

(51) Int. Cl.
*F16J 15/18*   (2006.01)
(52) U.S. Cl. .............. 277/321; 277/510; 277/511
(58) Field of Classification Search .......... 277/510, 277/511, 516, 520, 522, 527, 529–531, 539, 277/540, 342, 321, 929
See application file for complete search history.

(56) References Cited

U.S. PATENT DOCUMENTS

| | | | | |
|---|---|---|---|---|
| RE254 E | * | 1/1854 | Allen et al. ................. | 277/505 |
| 200,459 A | * | 2/1878 | Jerome, C.C. .............. | 277/505 |
| 1,506,420 A | * | 8/1924 | Flaspoehler et al. ......... | 277/522 |
| 2,403,875 A | * | 7/1946 | Neumann .................... | 277/350 |
| 2,434,670 A | * | 1/1948 | Mrosco ....................... | 277/369 |
| 2,567,479 A | * | 9/1951 | Hebard ........................ | 277/329 |
| 2,628,112 A | * | 2/1953 | Hebard ........................ | 277/506 |
| 3,785,659 A | * | 1/1974 | Maurer et al. ................ | 277/500 |
| 3,982,765 A | * | 9/1976 | Fickelscher et al. .......... | 277/412 |
| 4,351,531 A | * | 9/1982 | Maasberg et al. ............ | 277/516 |
| 4,643,440 A | * | 2/1987 | Massey, Jr. .................. | 277/530 |
| 4,991,857 A | * | 2/1991 | Pippert ........................ | 277/529 |
| 5,056,758 A | * | 10/1991 | Bramblet ..................... | 251/214 |
| 5,230,498 A | * | 7/1993 | Wood et al. .................. | 251/214 |
| 5,306,021 A | * | 4/1994 | Morvant ...................... | 277/584 |
| 5,333,883 A | * | 8/1994 | Piper et al. ................... | 277/529 |
| 5,593,166 A | * | 1/1997 | Lovell et al. ................. | 277/516 |
| 6,062,570 A | * | 5/2000 | Erickson ...................... | 277/529 |
| 6,076,831 A | * | 6/2000 | Pfannenschmidt .......... | 277/511 |
| 6,494,464 B1 | * | 12/2002 | Chandler et al. ............. | 277/628 |

* cited by examiner

*Primary Examiner*—Jennifer H Gay
*Assistant Examiner*—Gilbert Y Lee
(74) *Attorney, Agent, or Firm*—Woodling, Krost and Rust

(57) ABSTRACT

The invention pertains to a sealing arrangement 10, 10a, which acts between a housing 12 and a component 14 installed in the housing 12, with a stop 16, permanently connected to the housing 12; with a spring 20, which is supported on the stop 16; and, with at least one first sealing element 22 in working connection with the spring 20. Abutment 34 is designed to be adjusted against the force of the spring such that the spring 20 is completely compressed—squeezed into a block—and additional load can be exerted on the sealing element 22, so that in particular any leakage which has developed can be stopped—on an emergency basis—by the exertion of additional load on the sealing element 22, which has the effect of increasing the sealing force which the sealing element 22 exerts.

19 Claims, 2 Drawing Sheets

SEALING ARRANGEMENT

Figure 1:
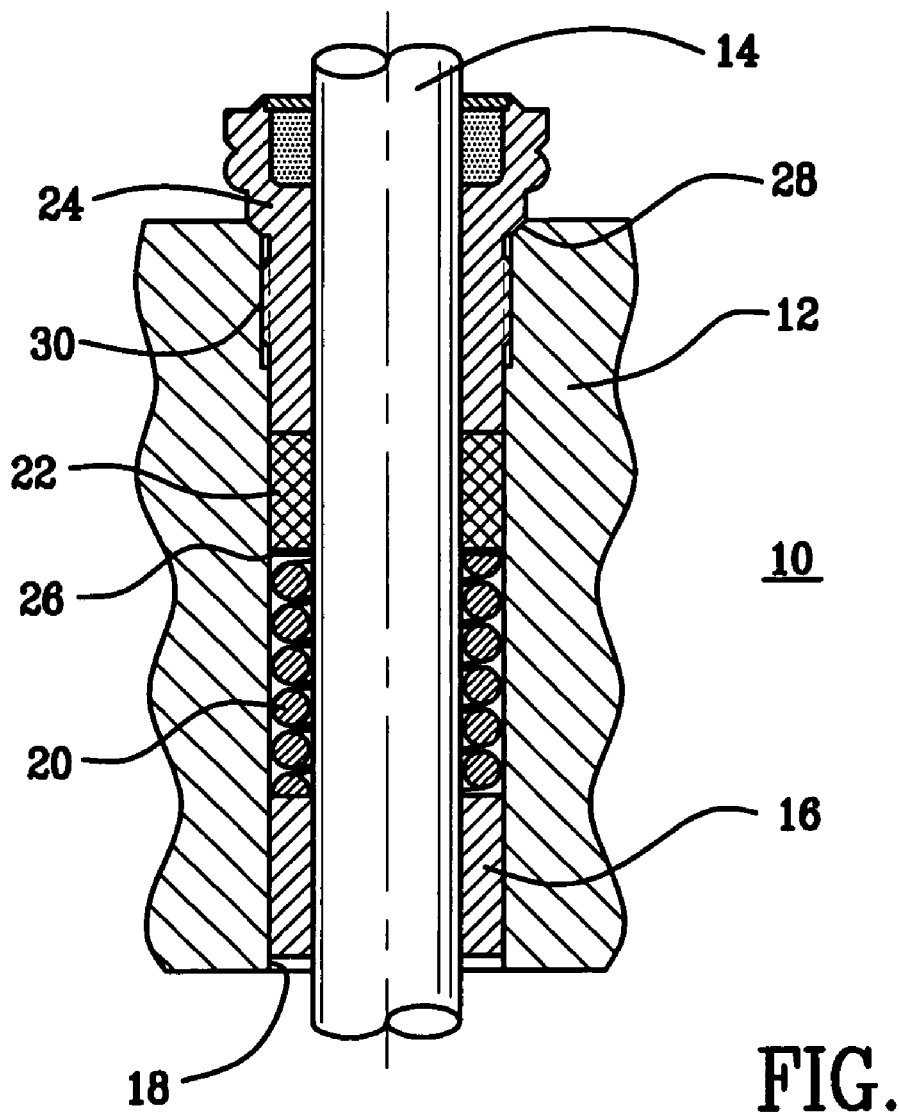

The invention pertains to a sealing arrangement of the type indicated in the introductory clause of claim 1.

There are basically two different designs for these types of sealing arrangements, which are used to seal movable tapered rods or shafts in linear or pivoting positioning devices. They are designed and used as so-called stuffing box packings.

In the first known type of sealing arrangement, namely, an adjustable stuffing box, several sealing rings of sealing material are introduced between a housing and a component. These sealing rings are usually provided with an angled slot to facilitate assembly and are produced out of a PTFE compound, of a graphite-filled fabric, or of pressed graphite. The radial pressure applied to produce the seal is applied axially by way of a thrust piece, and the amount of pressure which is applied is adjusted by tightening or loosening a nut, which cooperates with the housing and which is connected to the thrust piece. The sides of the sealing rings facing away from the thrust piece rest against a stop, which is permanently connected to the housing or is an integral part of the housing. The component, in the form of a rod, is supported concentrically inside the housing.

An advantage of this design is that, when a leak develops, the amount of pressure applied by the sealing element and thus the sealing force of the sealing element can be adjusted by advancing the thrust piece, which means that the sealing rings do not have to be replaced immediately. The thrust piece is adjusted axially by way of the nut—a stuffing box nut—or by a thrust piece with a stuffing box cone plate.

The second known embodiment also consists of a housing which holds a concentrically mounted component, possibly in the form of a shaft. Here, too, a stop is connected permanently to the housing. Adjacent to the stop is a spring, which presses against a sealing element, which acts directly or indirectly on an abutment in the form of a thrust piece, which is screwed to a stop in the housing. This is known as a spring-loaded stuffing box, the sealing element of which has several V-rings, usually made of a PTFE compound. The sealing element is bounded on the spring side by a thrust washer, which rests against the spring. The actual sealing force of the sealing element is produced primarily by the internal pressure in the housing, which spread the V-rings apart. The spring is provided so that a certain sealing force can be guaranteed even when the internal pressure is low or during the period that the pressure is building up. The sealing arrangement, however, is able to function even without a stop and a spring. In this case, the sealing force is produced only by the internal pressure acting on the sealing element.

The sealing arrangement with a spring has an advantage over the adjustable design mentioned first, because clearly defined forces are acting on the sealing element even when the pressures are low, which is important for the functioning of automatically controlled positioning devices. In addition, the spring can compensate for a small amount of wear or a for certain amount of permanent compression set of the sealing material. That the abutment is held on the stop, furthermore, means that the pretension of the spring is determined by the abutment; and because the abutment cannot be moved too far toward the spring, the spring cannot be completely compressed, which means that there can be no damage to the sealing elements as a result of excessive compression. These types of sealing arrangements are considered maintenance-free and have a much longer service life than other such arrangements subjected to equivalent loads.

The disadvantage of this design in comparison with adjustable sealing arrangements is that, when leakage occurs, the sealing elements must be replaced more-or-less immediately. When the sealing arrangement starts to leak, there is no possibility, as a last resort, of compressing the sealing elements to maintain a certain temporary and limited functionality of the sealing arrangement—the so-called "Friday evening solution", as is possible in the case of the previously mentioned adjustable sealing arrangement.

Proceeding from this second, spring-loaded sealing arrangement, the invention is based on the task of creating a sealing arrangement of the type indicated in the introductory clause of claim 1 which, while avoiding the disadvantages mentioned, guarantees leakproof operation over the course of a long service life and also under emergency conditions after the occurrence of material fatigue.

This task is accomplished by the characterizing features of claim 1 in conjunction with the features of the introductory clause.

The subclaims represent advantageous elaborations of the invention.

The invention is based on the insight that, even in the case of spring-loaded sealing arrangements, the advantages of the adjustable sealing arrangement can be realized if the abutment—i.e., the thrust piece—is designed so that it can be adjusted in opposition to the force of the spring.

According to the invention, therefore, the abutment is designed so that it can be moved against the force of the spring to such an extent that the spring is completely compressed, that is, squeezed into a solid block, as a result of which additional load can be exerted on the sealing element. Any leakage which might occur, therefore, such as leakage caused by a deterioration of the properties of the material of the sealing elements, can be stopped—under emergency operating conditions—by the exertion of additional load on the sealing elements, which has the effect of increasing the sealing force which the sealing elements can exert. As a result, the goal can be easily achieved that, when the sealing elements starts to leak, it is possible as a temporary measure to maintain a limited sealing function for a limited time by compressing the sealing elements. The function of the spring is thus eliminated, and the sealing force which remains is determined only by the abutment.

So that both the sealing force produced primarily by the internal pressure and the spring and the sealing force produced by the adjustable abutment can be optimized, a second sealing element is inserted between the abutment and the first sealing element. In particular, the second sealing element has a design which differs from that of the first sealing element. The second sealing element presses by virtue of its pretension preferably against the housing and the component.

According to one embodiment of the invention, the first sealing element comprises one or more V-rings, which, when subjected to load from one side, move radially outward and thus provide a lateral sealing action. The V-rings preferably consist of PTFE compound.

The second sealing element consists of one or more rings; at least one ring can have an angled slot so that it can move toward the component transversely to the force of the spring. This slot also simplifies assembly, because the rings can be mounted without first removing the component, which can be in the form of a rod, for example.

The second sealing element can consist of PTFE compound, of graphite-filled fabric, or of pressed graphite.

According to another embodiment of the invention, a first thrust washer is installed between the spring and the first sealing element. In particular, a second thrust washer can also be installed between the second sealing element and the abutment.

The component can be designed as a shaft, an axle, a rod, or the like, but especially as a tapered rod.

According to another embodiment of the invention, a spacer is provided, which defines the position of the abutment relative to the stop and thus determines the amount of elastic pretension present under normal operating conditions. This offers the advantage of preventing the abutment from being moved too far toward the spring during the assembly process, which would have the effect of compressing the spring and damaging the sealing elements by crushing them. If the sealing property of the sealing elements starts to deteriorate, for example, this spacer can be removed, which has the effect of advancing the abutment. Another spacer for emergency operation can then be introduced if desired to prevent the sealing elements from being damaged by too much compression.

A set of markings can be provided to indicate the position of the abutment relative to the stop, especially to indicate whether the sealing arrangement is located in the normal operating position or in an emergency operating position.

The abutment is preferably secured removably in position in such a way that that it cannot work itself loose under the effects of temperature fluctuations, vibrations, etc.

According to another embodiment of the invention, the sealing arrangement is designed as a stuffing box packing.

Figure 2:
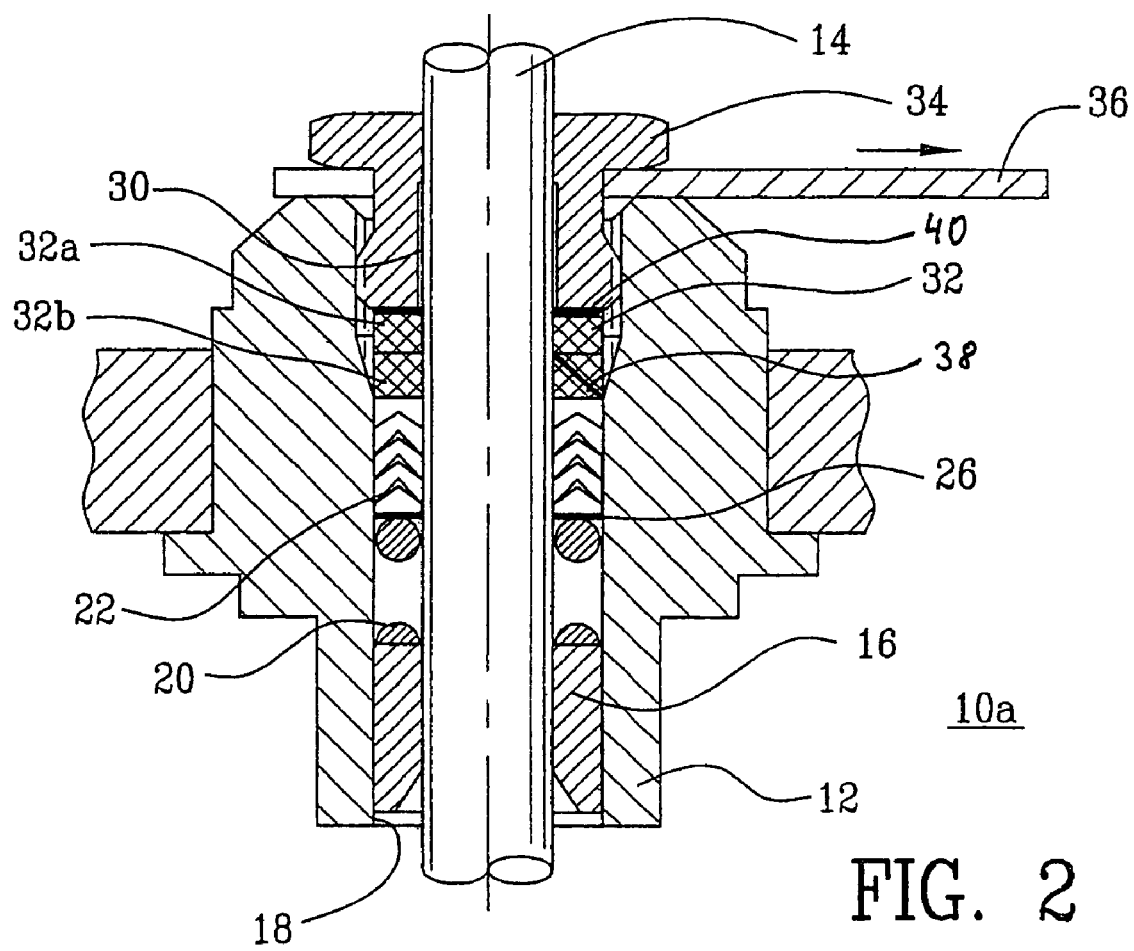

Additional advantages and features of the invention can be derived from the following description of an exemplary embodiment in conjunction with the drawing:

FIG. 1 shows a cross-sectional view through a sealing arrangement according to the state of the art; and FIG. 2 shows a cross-sectional view through the sealing arrangement according to the invention.

FIG. 1 shows a sealing arrangement 10 according to the state of the art. The sealing arrangement 10 is introduced between a housing 12 and a component 14, designed as a shaft. The housing 12 and the component 14, together with the sealing arrangement 10, represent part of a pivoting actuator device.

The component 14 is mounted concentrically in the housing 12. The sealing arrangement 10 is also concentric to the component 14 within the housing 12.

The housing 12 has a bore 18, in which the sealing arrangement 10 and the component 14 are installed.

The sealing arrangement 10 has a stop 16, which is permanently connected to the housing 12. In addition, the sealing arrangement 10 is provided with a spring 20, with a first sealing element 22, and with an abutment 24. One end of the spring 20 rests against the stop 16, while the other end rests against a thrust washer 26, against which in turn the first sealing element 22 rests. The abutment 24 is screwed by its thread 30 into the housing 12 until its flange 28, serving as a stop, makes contact with the housing. The abutment is thus brought into and fixed in position with respect to the first sealing element 22 and the spring 20 in the assembled state shown in FIG. 1.

This known sealing arrangement 10 is also called a "spring-loaded stuffing box". It offers the advantage that clearly defined forces are present, which is very important for the proper operation of automatic actuators. In addition, the spring 20 can also compensate for small amounts of wear or a certain amount of permanent compression set of the sealing material. These types of sealing arrangements 10 are considered maintenance-free and have a much longer service life under equivalent loads than other such arrangements. The problem, however, is that, when leakage occurs, the sealing element 22 must be replaced quickly.

FIG. 2 shows a cross-sectional view of a sealing arrangement 10a according to the invention. The same reference numbers as those of FIG. 1 are used to designate equivalent parts. The sealing arrangement 10a of the invention overcomes the disadvantages just mentioned above.

Both the sealing arrangement 10a and the component 14 in the form of a shaft are introduced into the bore 18 of the housing 12.

The sealing arrangement 10a requires a stop 16 permanently attached to the housing 12, this stop being followed by the spring 20. The spring 20 rests by way of the thrust washer 26 against the first sealing element 22. The first sealing element 22 rests in turn against a second sealing element 32. An abutment 34, which is in the position for normal operation in the assembled state shown in FIG. 2, follows the second sealing element 32. A spacer 36, which can be removed if necessary, is inserted between the abutment 34 and the housing 12.

The first sealing element 22 consists of several V-rings, which, when subjected to load, come to rest with a sealing action against the inside wall of the bore 18 of the housing 12 and the surface of the component 14. The second sealing element 32, furthermore, consists of two rings 32a, 32b, which have angled slots to simplify installation and which are produced out of pressed graphite. Under load, the rings 32a, 32b of the second sealing element 32 expand radially toward the housing 12 and the component 14.

So that the advantages of the spring-loaded sealing arrangement 10a can be fully exploited under normal operating conditions, the abutment 34 projects to an appropriately defined extent into the intermediate space between the housing 12 and the component 14. The pressure which is applied to the sealing elements 22 and 32 and to the spring 20 is thus defined. The simplest way to define the amount of pressure thus applied is by the mechanical contact of the abutment with the removably installed spacer 36. The thickness of the spacer 36 is selected so that, after the spacer 36 has been removed and the abutment 34 has been advanced, the spring 20 can be compressed into a block and additional sealing force can also be produced by way of the sealing elements 22, 32. If, under normal operating conditions, leakage is discovered in the sealing arrangement 10a, the spacer 36 can be removed; the spring 20 can be squeezed into a block by screwing down the abutment 34; and, by tightening the abutment even more, the combination of V-rings and sealing rings can be squeezed to such an extent that a certain sealing function is provided again at least temporarily.

A set of markings is also provided to show the position of the abutment 34 relative to the stop 16, especially to indicate the normal and the emergency operating positions of the sealing arrangement 10. For example, these markings can be realized in the form of colored rings painted around the abutment 34. The number of rings projecting visibly from the bore 18 indicates the position of the abutment. The abutment 34 can also be secured by a tab, connected to the housing 12, to prevent it from working itself loose under the effects of vibrations and/or temperature fluctuations.

LIST OF REFERENCE NUMBERS 10 sealing arrangement
10a sealing arrangement
12 housing
14 component-shaft
16 stop
18 bore
20 spring 22 first sealing element
24 abutment
26 thrust washer
28 flange
30 thread
32 second sealing element
32a ring
32b ring
34 abutment
36 spacer

The invention claimed is:

1. A sealing arrangement (10, 10a), which acts between a housing (12) and a component (14) installed in the housing (12), with a stop (16) permanently connected to the housing (12), with a spring (20) supported on the stop (16), with at least one first sealing element (22) in working connection with the spring (20), and with an abutment (24, 34), which is connected to the housing (12) and which cooperates with the side of the sealing element (22) facing away from the spring (20), where, at least as a result of the force of the spring, the sealing element (22) presses against certain areas of the housing (12) and the component (14) to create a sealing effect extending from the front to the rear of the housing (12) and of the component (14), characterized in that a removable installed spacer resides in between and in engagement with said abutment and said housing, said abutment (34) is designed so that it can be advanced against the force of the spring, said abutment (34) is in mechanical contact with said removable installed spacer (36) which defines the position of the abutment (34) relative to the stop (16) and the amount of pretension of the spring under normal operating conditions, so that after removing the spacer (36) the abutment (34) can be advanced against the force of the spring to such an extent that the spring (20) is completely compressed and the sealing element (22) is subjected to additional load, so that in particular any leakage which has developed can be stopped on an emergency basis by the exertion of additional load on the sealing element (22), which has the effect of increasing the sealing force which the sealing element (22) exerts.

2. The sealing arrangement according to claim 1; characterized in that a second sealing element (32) is inserted between the abutment (34) and the first sealing element (22).

3. The sealing arrangement according to claim 2, characterized in that the second sealing element (32) has a design which differs from that of the first sealing element (22).

4. The sealing arrangement according to claim 3, characterized in that the second sealing element (22) presses by virtue of its pretension against the housing (12) and the component (14).

5. The sealing arrangement according to claim 2, characterized in that the second sealing element (32) consists of one or more rings, where at least one ring has an angled slot (38) so that it can move toward the housing (12) and the component (14) transversely to the force of the spring.

6. The sealing arrangement according to claim 5, characterized in that the second sealing element (32) comprises PTFE or graphite-filled fabric or pressed graphite.

7. The sealing arrangement according to claim 2, characterized in that a first trust washer (26) is installed between the spring (20) and the first sealing element (22) and a second thrust washer (40) is installed between the second sealing element (32) and the abutment (34).

8. The sealing arrangement according to claim 2, characterized in that the component (14) is designed as a shaft, an axle, or rod.

9. The sealing arrangement according to claim 2, characterized in that a set of markings is provided, which shows the position of the abutment (34) relative to the stop (16), indicating in particular the position of the abutment corresponding to normal operation and the position of the abutment corresponding to the emergency operation of the sealing arrangement.

10. The sealing arrangement according to claim 2, characterized in that the abutment is removably secured in its position so that it cannot work itself loose under the effects of, for example, temperature fluctuations, vibrations, etc.

11. The sealing arrangement according to claim 2, characterized by a design as a stuffing box packing.

12. The sealing arrangement according to claim 2 characterized in that a second thrust washer (40) is installed between the second sealing element (32) and the abutment (34).

13. The sealing arrangement according to claim 1, characterized in that the first sealing element (22) comprises one or more V-rings.

14. The sealing according to claim 13, characterized in that the V-rings consist of PTFE compound.

15. The sealing arrangement according to claim 1, characterized in that a first thrust washer (26) is installed between the spring (20) and the first sealing element (22).

16. The sealing arrangement according to claim 1, characterized in that the component (14) is designed as a shaft, an axle, or rod.

17. The sealing arrangement according to claim 1, characterized in that a set of markings is provided, which shows the position of the abutment (34) relative to the stop (16), indicating in particular the position of the abutment corresponding to normal operation and the position of the abutment corresponding to the emergency operation of the sealing arrangement.

18. The sealing arrangement according to claim 1, characterized in that the abutment is removably secured in its position so that it cannot work itself loose under the effects of, for example, temperature fluctuations, vibrations, etc.

19. The sealing arrangement according to claim 1, characterized by a design as a stuffing box packing.

* * * * *